(12) United States Patent
Salter

(10) Patent No.: US 9,376,058 B2
(45) Date of Patent: Jun. 28, 2016

(54) FLUID LEVEL INDICATOR USING PHOTOLUMINESCENT ILLUMINATION

(71) Applicant: Ford Global Technologies, LLC, Dearborn, MI (US)

(72) Inventor: Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 14/514,524

(22) Filed: Oct. 15, 2014

(65) Prior Publication Data

US 2015/0138805 A1 May 21, 2015

Related U.S. Application Data

(63) Continuation-in-part of application No. 14/322,450, filed on Jul. 2, 2014, which is a continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013.

(51) Int. Cl.
*B60Q 3/06* (2006.01)
*B60Q 3/00* (2006.01)

(52) U.S. Cl.
CPC . *B60Q 3/06* (2013.01); *B60Q 3/008* (2013.01)

(58) Field of Classification Search
CPC .................................. B60Q 3/06; B60Q 3/008
See application file for complete search history.

(56) References Cited

U.S. PATENT DOCUMENTS

| | | |
|---|---|---|
| 5,842,763 A | 12/1998 | Lakosky |
| 6,729,738 B2 | 5/2004 | Thompson et al. |
| 6,773,129 B2 | 8/2004 | Anderson, Jr. et al. |
| 6,871,986 B2 | 3/2005 | Yamanaka et al. |
| 6,990,922 B2 | 1/2006 | Ichikawa et al. |
| 7,213,923 B2 | 5/2007 | Liu et al. |
| 7,264,366 B2 | 9/2007 | Hulse |
| 7,264,367 B2 | 9/2007 | Hulse |
| 7,753,541 B2 | 7/2010 | Chen et al. |
| 7,834,548 B2 | 11/2010 | Jousse et al. |
| 8,016,465 B2 | 9/2011 | Egerer et al. |
| 8,071,988 B2 | 12/2011 | Lee et al. |
| 8,203,260 B2 | 6/2012 | Li et al. |
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |

(Continued)

FOREIGN PATENT DOCUMENTS

| | | |
|---|---|---|
| CN | 201169230 Y | 12/2008 |
| CN | 201193011 Y | 2/2009 |

(Continued)

*Primary Examiner* — Mary Ellen Bowman
(74) *Attorney, Agent, or Firm* — Vichit Chea; Price Heneveld LLP

(57) ABSTRACT

An illumination system for a vehicle container includes a fluid container, a photoluminescent portion disposed on the container, and a light source located proximate the container. The light source is configured to emit light at a first wavelength directed toward the photoluminescent portion. The photoluminescent portion is configured to convert the first wavelength to at least a second wavelength longer than the first wavelength to illuminate the container.

20 Claims, 5 Drawing Sheets

(56) References Cited

U.S. PATENT DOCUMENTS

| | | |
|---|---|---|
| 8,606,430 B2 | 12/2013 | Seder et al. |
| 8,631,598 B2 | 1/2014 | Li et al. |
| 8,724,054 B2 | 5/2014 | Jones |
| 8,773,012 B2 | 7/2014 | Ryu et al. |
| 2003/0179548 A1 | 9/2003 | Becker et al. |
| 2004/0213088 A1 | 10/2004 | Fuwausa |
| 2006/0032294 A1* | 2/2006 | Duerr ............... G01M 3/20 73/40.7 |
| 2006/0087826 A1 | 4/2006 | Anderson, Jr. |
| 2009/0219730 A1 | 9/2009 | Syfert et al. |
| 2012/0001406 A1 | 1/2012 | Paxton et al. |
| 2013/0335994 A1 | 12/2013 | Mulder et al. |
| 2014/0266666 A1 | 9/2014 | Habibi |

FOREIGN PATENT DOCUMENTS

| | | |
|---|---|---|
| DE | 29708699 U1 | 7/1997 |
| DE | 10319396 A1 | 11/2004 |
| DE | 102011114075 A1 | 6/2012 |
| EP | 1793261 A1 | 6/2007 |
| EP | 2778209 A1 | 9/2014 |
| JP | 2000159011 A | 6/2000 |
| WO | 2006047306 A1 | 5/2006 |
| WO | 2014068440 A1 | 8/2014 |

* cited by examiner

FLUID LEVEL INDICATOR USING PHOTOLUMINESCENT ILLUMINATION

CROSS-REFERENCE TO RELATED APPLICATIONS

This application is a continuation-in-part of U.S. patent application Ser. No. 14/322,450, filed Jul. 2, 2014, and entitled "PHOTOLUMINESCENT ENGINE COMPARTMENT LIGHTING," which is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from photoluminescent materials offers a unique and attractive viewing experience. It is therefore desired to incorporate such photoluminescent materials in portions of vehicles for various lighting applications.

SUMMARY OF THE INVENTION

According to one aspect of the present invention, an illuminated fluid level indication system for a vehicle includes a container, a fluid disposed in the container, a photoluminescent portion disposed on the container, and a light source operable to emit an emission to excite the photoluminescent portion and thereby illuminate the container. A fluid level is determined based on a degree of illumination of the container when the photoluminescent portion is exposed to the emission.

According to another aspect of the present disclosure, an illumination system for a vehicle container includes a fluid container, a photoluminescent portion disposed on the container, and a light source located proximate the container. The light source is configured to emit light at a first wavelength directed toward the photoluminescent portion. The photoluminescent portion is configured to convert the first wavelength to at least a second wavelength longer than the first wavelength to illuminate the container.

According to yet another aspect of the present disclosure, an illumination system for a vehicle container includes a container for holding a fluid which defines a fluid level and a headspace above the fluid, a photoluminescent portion located on the container, and a light source disposed inside the container operable to emit an emission to excite the photoluminescent portion. The photoluminescent portion illuminates the container above the fluid level.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are discussed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system for a vehicle configured to illuminate at least a portion of an engine compartment. In some implementations, a light source may be configured to illuminate a photoluminescent portion corresponding to at least one engine compartment fixture, component, fluid reservoir, and/or any other portion of the vehicle located proximate the engine compartment. In various implementations, a first photoluminescent portion may correspond to a functional lighting unit configured to illuminate a fluid reservoir. A second photoluminescent portion may correspond to an additional lighting unit configured to illuminate a fluid level indicator.

Figure 1:
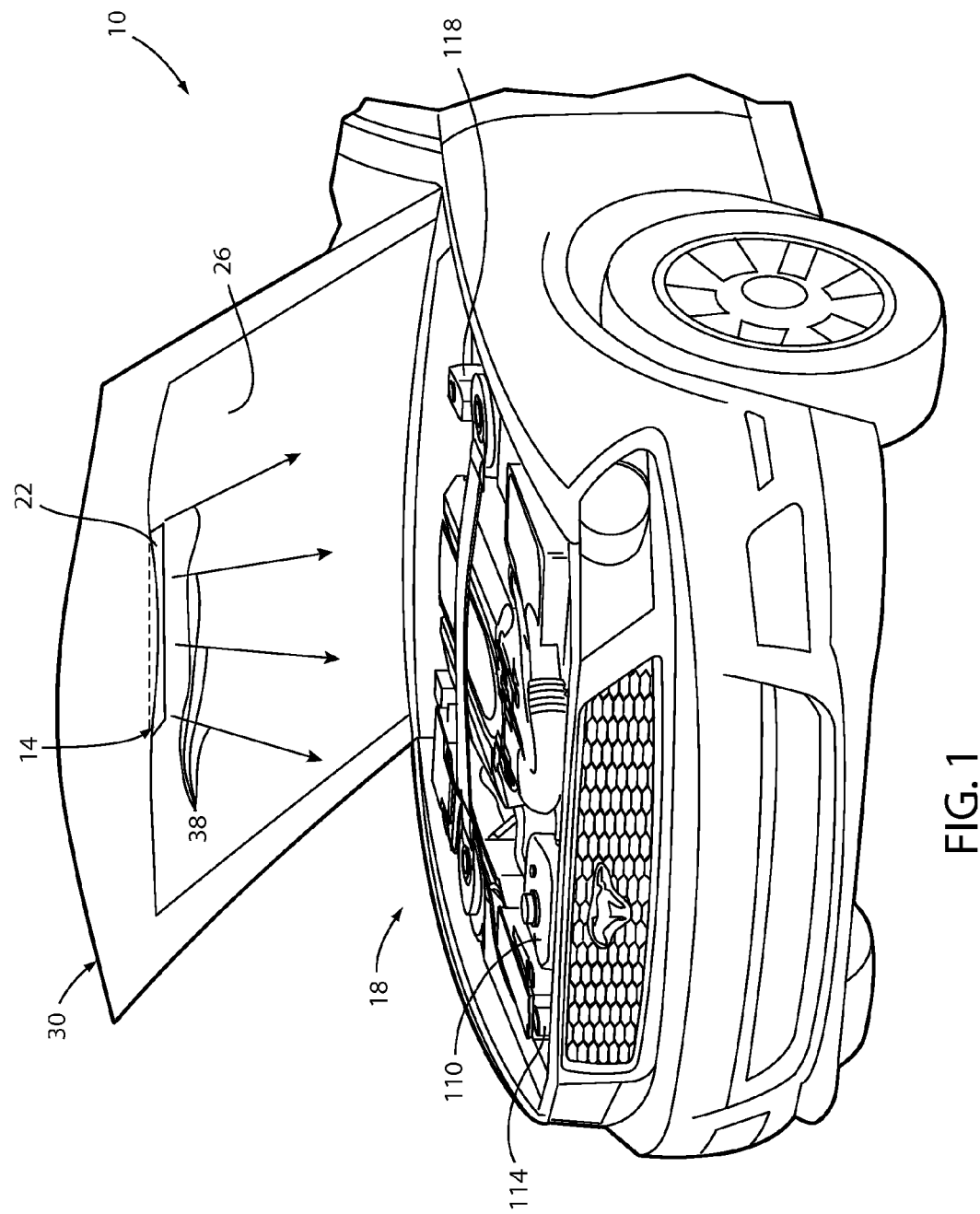
FIG. 1 is a perspective view of a vehicle having a photoluminescent illumination system for fluid level indication.

Referring to FIG. 1, a perspective view of a vehicle 10 is shown demonstrating an illumination system 14, according to one embodiment. The illumination system 14 is configured to increase the visibility and/or aesthetic appeal of at least one fixture located within an engine compartment 18 of the vehicle 10. The illumination system 14 comprises a light source 22 disposed on an interior surface 26 of a hood 30 that covers the engine compartment 18 and at least one photoluminescent portion 34 (not shown) disposed within the engine compartment 18. The hood 30 may be a panel that pivots between a downward closed position that conceals the engine compartment 18 and an upward open position that exposes the engine compartment 18. The light source 22 is configured to output a first emission 38 corresponding to a first wavelength of light. In response to receiving the light at the first wavelength, the photoluminescent portion 34 may become illuminated and emit at least a second emission 42 (not shown) having a second wavelength of light longer than the first wavelength.

The photoluminescent portion 34 may include a plurality of photoluminescent portions. The photoluminescent portion 34 may correspond to any number of fixtures located in the engine compartment 18 and/or disposed on the interior surface 26 of the hood 30. In an exemplary implementation, the photoluminescent portion 34 may correspond to at least one fixture located in the engine compartment 18. The photoluminescent portion 34 may be configured to illuminate the at least one fixture to provide an ambient glow emitted from the at least one fixture.

The photoluminescent portion 34 may incorporate one or more photoluminescent structures configured to emit a specific color in response to the excitation generated in response to the first emission 38. In some implementations, a combination of photoluminescent structures may be utilized in the photoluminescent portion 34 to output various wavelengths corresponding to different colors of light. For example, in some implementations the photoluminescent portion 34 may be configured to emit a combination of red light, green light, and blue light to generate a light having a substantially white appearance. The illumination system 14 may provide various benefits including a cost-effective method for incorporating ambient lighting to at least one fixture proximate the engine compartment 18.

Figure 2A:
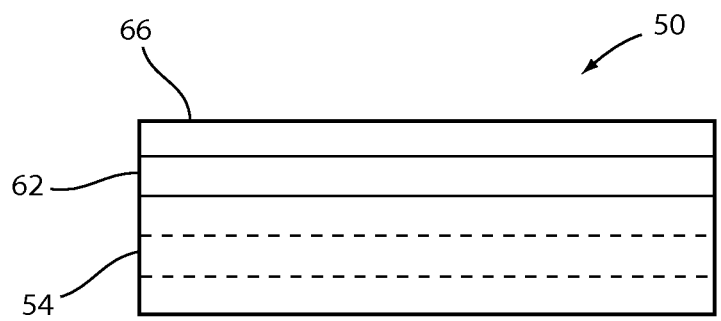
FIG. 2A is a side view of a photoluminescent structure rendered as a coating for the illumination system.
Figure 2B:
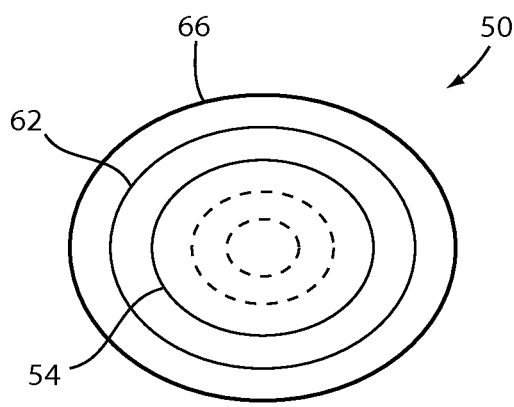
FIG. 2B is a top view of the photoluminescent structure rendered as a discrete particle for the illumination system.
Figure 2C:
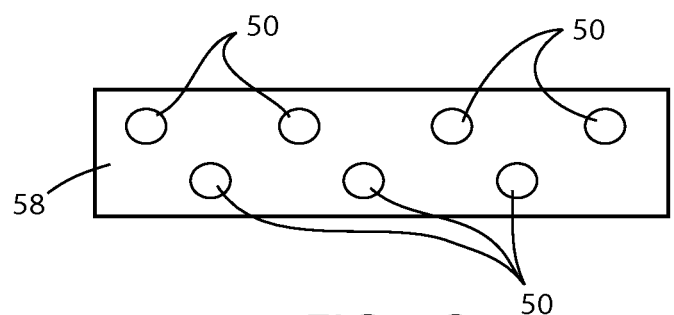
FIG. 2C is a side view of a plurality of photoluminescent structures rendered as discrete particles and incorporated into a separate structure for the illumination system.

Referring to FIGS. 2A-2C, a photoluminescent structure 50 is generally shown rendered as a coating (e.g., a film) capable of being applied to a vehicle fixture, a discrete particle capable of being implanted in a vehicle fixture, and a plurality of discrete particles incorporated into a separate structure capable of being applied to a vehicle fixture, respectively. The photoluminescent structure 50 may correspond to the photoluminescent portion 34 as discussed herein. At the most basic level, the photoluminescent structure 50 includes an energy conversion layer 54 that may be provided as a single layer or a multilayer structure, as shown through broken lines in FIGS. 2A and 2B.

The energy conversion layer 54 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g., the first wavelength, etc.) correspond to electromagnetic radiation utilized in the conversion process.

The photoluminescent portion may comprise at least one photoluminescent structure 50 comprising an energy conversion layer (e.g., conversion layer 54). The energy conversion layer 54 may be prepared by dispersing the photoluminescent material in a polymer matrix 58 to form a homogenous mixture using a variety of methods. Such methods may include preparing the energy conversion layer 54 from a formulation in a liquid carrier medium and coating the energy conversion layer 54 to a desired planar and/or non-planar substrate of a vehicle fixture. The energy conversion layer 54 coating may be deposited on a vehicle fixture by painting, screen printing, pad printing, spraying, slot coating, dip coating, roller coating, and bar coating. Additionally, the energy conversion layer 54 may be prepared by methods that do not use a liquid carrier medium.

For example, a solid state solution (homogenous mixture in a dry state) of one or more photoluminescent materials may be incorporated in a polymer matrix 58 to provide the energy conversion layer 54. The polymer matrix 58 may be formed by extrusion, injection molding, compression molding, calendaring, thermoforming, etc. In instances where one or more energy conversion layers 54 are rendered as particles, the single or multi-layered energy conversion layers 54 may be implanted into a vehicle fixture or panel. When the energy conversion layer 54 includes a multilayer formulation, each layer may be sequentially coated. Additionally, the layers can be separately prepared and later laminated or embossed together to form an integral layer. The layers may also be coextruded to prepare an integrated multi-layered energy conversion structure.

Referring back to FIGS. 2A and 2B, the photoluminescent structure 50 may optionally include at least one stability layer 62 to protect the photoluminescent material contained within the energy conversion layer 54 from photolytic and thermal degradation. The stability layer 62 may be configured as a separate layer optically coupled and adhered to the energy conversion layer 54. The stability layer 62 may also be integrated with the energy conversion layer 54. The photoluminescent structure 50 may also optionally include a protective layer 66 optically coupled and adhered to the stability layer 62 or any layer or coating to protect the photoluminescent structure 50 from physical and chemical damage arising from environmental exposure.

The stability layer 62 and/or the protective layer 66 may be combined with the energy conversion layer 54 to form an integrated photoluminescent structure 50 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 50. Once formed, the photoluminescent structure 50 may be applied to a chosen vehicle fixture.

In some implementations, the photoluminescent structure 50 may be incorporated into a vehicle fixture as one or more discrete multilayered particles as shown in FIG. 2C. The photoluminescent structure 50 may also be provided as one or more discrete multilayered particles dispersed in a polymer formulation that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMIS- SION," filed Jul. 31, 2012, the entire disclosure of which is incorporated herein by reference.

Figure 3:
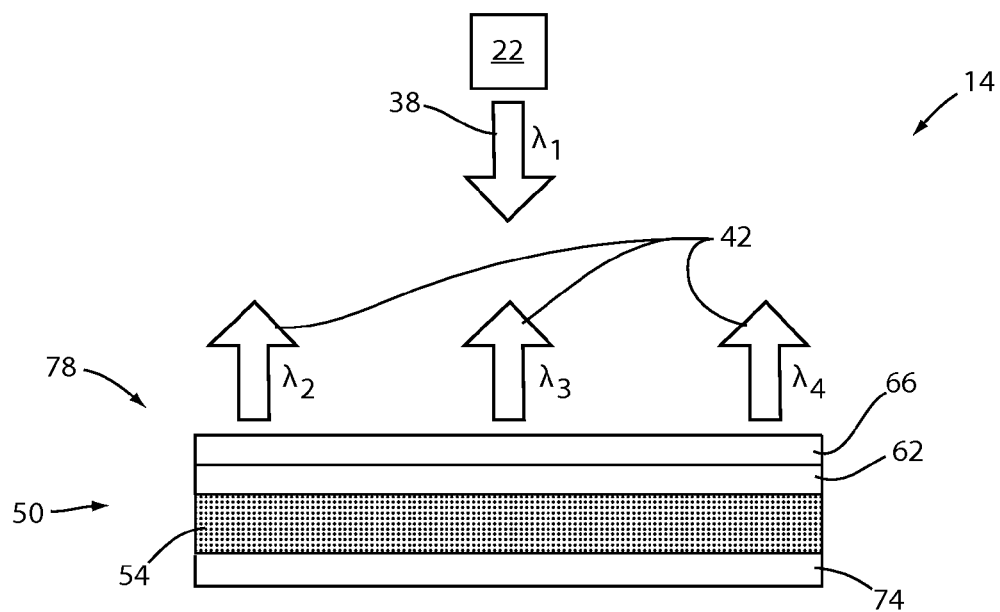
FIG. 3 is a schematic diagram of a vehicle illumination system configured to convert a first emission of light to a second emission of light according to one embodiment.

Referring to FIG. 3, the illumination system 14 is generally shown in one embodiment according to a front-lit configuration to convert the first emission 38 from the light source 22 to the second emission 42. The first emission 38 comprises a first wavelength $\lambda_1$, and the second emission 42 comprises a second wavelength $\lambda_2$. The illumination system 14 may include the photoluminescent structure 50 rendered as a coating and applied to a substrate 74 of a vehicle fixture 78. The photoluminescent structure 50 may include the energy conversion layer 54, and in some implementations may include the stability layer 62 and/or protective layer 66. In response to the light source 22 being activated, the first emission 38 is converted from the first wavelength $\lambda_1$ to the second emission 42 having at least the second wavelength $\lambda_2$. The second emission 42 may comprise a plurality of wavelengths $\lambda_2$, $\lambda_3$, $\lambda_4$ configured to emit significantly white light from the vehicle fixture 78.

In various implementations, the illumination system 14 comprises at least one energy conversion layer 54 configured to convert the first emission 38 at the first wavelength $\lambda_1$ to the second emission 42 having at least the second wavelength $\lambda_2$. In order to generate the plurality of wavelengths $\lambda_2$, $\lambda_3$, $\lambda_4$, the energy conversion layer 54 may comprise a red-emitting photoluminescent material, a green-emitting photoluminescent material, and a blue-emitting photoluminescent material dispersed in the polymer matrix 58. The red, green, and blue-emitting photoluminescent materials may be combined to generate the significantly white light for the second emission 42. Further, the red, green, and blue-emitting photoluminescent materials may be utilized in a variety of proportions and combinations to control the color of the second emission 42.

Each of the photoluminescent materials may vary in output intensity, output wavelength, and peak absorption wavelengths based on a particular photochemical structure and combinations of photochemical structures utilized in the energy conversion layer 54. As an example, the second emission 42 may be changed by adjusting the wavelength of the first emission $\lambda_1$ to activate the photoluminescent materials at different intensities to alter the color of the second emission 42. In addition to or alternatively to the red, green, and blue-emitting photoluminescent materials, other photoluminescent materials may be utilized alone and in various combinations to generate the second emission 42 in a wide variety of colors. In this way, the illumination system 14 may be configured for a variety of applications to provide a desired lighting color and effect for the vehicle 10.

The light source 22 may also be referred to as an excitation source and is operable to emit at least the first emission 38. The light source 22 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 38. The first emission 38 from the light source 22 may be configured such that the first wavelength $\lambda_1$ corresponds to at least one absorption wavelength of the one or more photoluminescent materials of the energy conversion layer 54. In response to receiving the light at the first wavelength $\lambda_1$, the energy conversion layer 54 may be excited and output the one or more output wavelengths $\lambda_2$, $\lambda_3$, $\lambda_4$. The first emission 38 provides an excitation source for the energy conversion layer 54 by targeting absorption wavelengths of the various photoluminescent materials utilized therein. As such, the illumination system 14 is configured to output the second emission 42 to generate a desired light intensity and color.

Though the plurality of wavelengths is referred to as the wavelengths $\lambda_2$, $\lambda_3$, $\lambda_4$, the photoluminescent materials may be combined in various proportions, types, layers, etc. to generate a variety of colors for the second emission 42. The photoluminescent materials may also be utilized in a plurality of photoluminescent portions distributed along a path of the first emission 38 to generate any number of emissions, for example a third emission, a fourth emission, etc.

In an exemplary implementation, the light source 22 comprises an LED configured to emit the first wavelength $\lambda_1$ which corresponds to a blue spectral color range. The blue spectral color range comprises a range of wavelengths generally expressed as blue light (~440-500 nm). In some implementations, the first wavelength $\lambda_1$ may also comprise wavelengths in a near ultraviolet color range (~390-450 nm). In an exemplary implementation, $\lambda_1$ may be approximately equal to 470 nm. In some implementations, the first wavelength $\lambda_1$ may be approximately less than 500 nm such that the first wavelength of the light is not significantly visible.

The blue spectral color range and shorter wavelengths may be utilized as an excitation source for the illumination system 14 due to these wavelengths having limited perceptual acuity in the visible spectrum of the human eye. By utilizing shorter wavelengths for the first wavelength $\lambda_1$, and converting the first wavelength with the conversion layer 54 to at least one longer wavelength, the illumination system 14 creates a visual effect of light originating from the photoluminescent structure 50. In this configuration, light is emitted from the photoluminescent structure 50 from locations of the vehicle 10 that may be inaccessible or costly to add conventional light sources requiring electrical connections.

As discussed herein, each of the plurality of wavelengths $\lambda_2$, $\lambda_3$, $\lambda_4$ may correspond to a significantly different spectral color range. The second wavelength $\lambda_2$ may correspond to the excitation of a red-emitting photoluminescent material having a wavelength of approximately 620-750 nm. The third wavelength $\lambda_3$ may correspond to the excitation of a green-emitting photoluminescent material having a wavelength of approximately 526-606 nm. The fourth wavelength $\lambda_4$ may correspond to a blue or blue-green-emitting photo luminescent material having a wavelength longer than the first wavelength $\lambda_1$ and approximately 430-525 nm. Though the wavelengths $\lambda_2$, $\lambda_3$, $\lambda_4$ are discussed herein as being utilized to generate a significantly white light, various combinations of photoluminescent materials may be utilized in the conversion layer 54 to convert the first wavelength $\lambda_1$ to one or more wavelengths corresponding to a variety of colors.

In some embodiments, a color of the ambient glow perceived by an onlooker may be altered by adjusting an intensity or energy output level of the light source 22. For example, if the light source 22 is configured to output the first emission 38 at a low level, substantially all of the first emission 38 may be converted to the second emission 42. In this configuration, a color of light corresponding to the second emission 42 may correspond to the color of the ambient glow. If the light source 22 is configured to output the first emission 38 at a high level, only a portion of the first emission 38 may be converted to the second emission 42. In this configuration, a color of light corresponding to a mixture of the first emission 38 and the second emission 42 may be output as the ambient glow.

Though a low level and a high level of intensity are discussed in reference to the first emission 38, it shall be understood that the intensity of the first emission 38 may be varied among a variety of intensity levels to adjust a hue of the color corresponding to the ambient glow. As described herein, the color of the second emission 42 may be significantly dependent on the particular photoluminescent materials utilized in the photoluminescent portion 34. Additionally, a conversion capacity of the photoluminescent portion may be significantly dependent on a concentration of the photoluminescent materials utilized in the photoluminescent portion 34. By adjusting the range of intensities that may be output from the light source 22, the concentration and proportions of the photoluminescent materials in the photoluminescent portion 34, and the types of photoluminescent materials utilized in the photoluminescent portion 34, the illumination systems discussed herein may be operable to generate a range of color hues of the ambient glow by blending the first emission 38 with the second emission 42.

Figure 4:
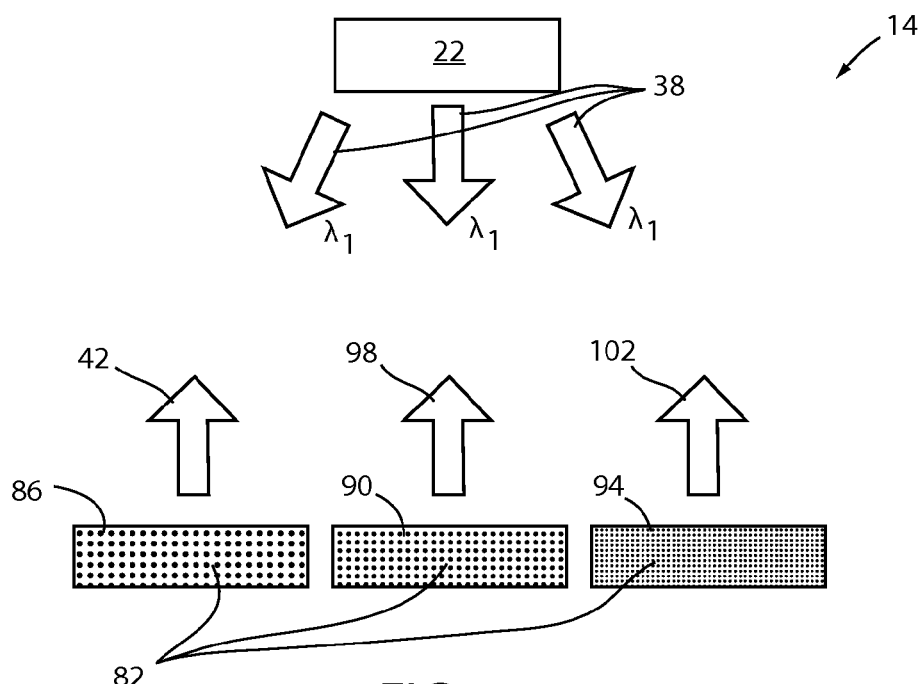
FIG. 4 is a schematic diagram of a vehicle illumination system configured to convert a first emission of light to a plurality of emissions of light according to another embodiment.

Referring to FIG. 4, the illumination system 14 is shown in the front-lit configuration according to another embodiment. In this exemplary embodiment, the light source 22 may be configured to emit the first emission 38 toward a plurality of photoluminescent portions 82. In this example, the plurality of photoluminescent portions 82 comprises a first photoluminescent portion 86, a second photoluminescent portion 90, and a third photoluminescent portion 94. Each of the photoluminescent portions 86, 90, 94 may be configured to convert the first wavelength $\lambda_1$ of the first emission 38 to one or more of the plurality of wavelengths $\lambda_2$, $\lambda_3$, $\lambda_4$. In this way, the first emission 38 may be converted into a plurality of emissions originating from each of the photoluminescent portions 82 to generate a multicolored lighting effect.

For example, the first photoluminescent portion 86 may comprise photoluminescent materials in a conversion layer configured to generate the second emission 42. The second photoluminescent portion 90 may comprise photoluminescent materials in a conversion layer configured to generate a third emission 98. The third photoluminescent portion 94 may comprise photoluminescent materials in a conversion layer configured to generate a fourth emission 102. Similar to the energy conversion layer 54, discussed in reference to FIG. 3, photoluminescent materials configured to emit light of various colors may be utilized in a variety of proportions and combinations to control the output color of each of the second emission 42, the third emission 98, and the fourth emission 102. Based on a desired lighting effect, each of the emissions 42, 98, 102 may comprise photoluminescent material configured to emit light having substantially similar colors, or a wide variety of color combinations.

To achieve the various colors and combinations of photoluminescent materials described herein, the illumination system 14 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 to Kingsley et al., entitled "PHOTOLUMINESCENT OBJECTS," filed Mar. 6, 2014; and U.S. Patent Publication No. 2014/0103258 to Agrawal et al., entitled "CHROMIC LUMINESCENT COMPOSITIONS AND TEXTILES," filed Apr. 17, 2014, all of which are included herein by reference in their entirety.

Figure 5:
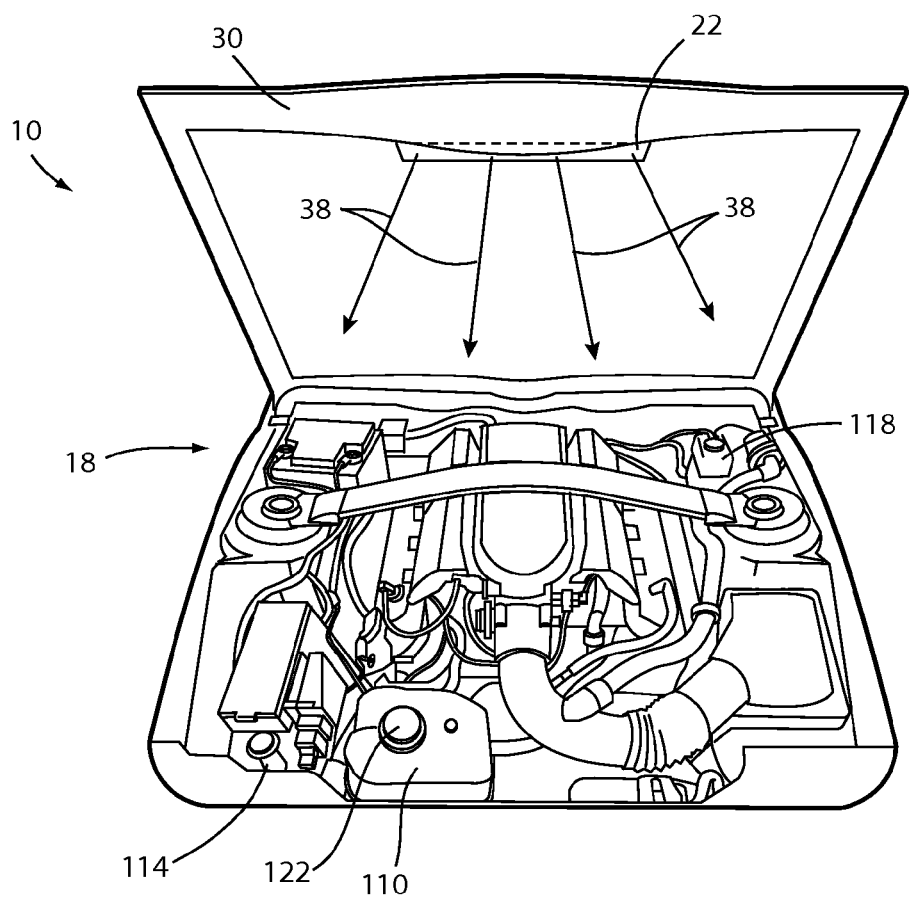
FIG. 5 is a perspective view of an engine compartment of the vehicle further illustrating the illuminated fluid level indicator.

As illustrated in FIG. 5, the light source 22 is configured to direct the first emission 38 downward toward the engine compartment 18 when the hood 30 is oriented in the open position. For example, the light source 22 may be connected to the interior surface 26 of the hood 30 such that the first emission 38 is directed substantially downward, focused centrally at the engine compartment 18. Though the first emission 38 may be directed through a substantially open volumetric space between the hood 30 and the engine compartment 18, the illumination of the light at the first wavelength $\lambda_1$ may be limited perceptually. The limited visible or perceptible illumination of the first wavelength $\lambda_1$ may be due to the first wavelength $\lambda_1$ being in the blue or near ultraviolet (UV) spectral color ranges. Due to the limited sensitivity of the human eye to light at such short wavelengths (e.g., blue colored light), the first emission may go unnoticed to an onlooker of the illumination system 14. In this way, the photoluminescent portion 34 may be illuminated such that the activation source of the photoluminescent portion 34 is not apparent to provide a sophisticated ambient lighting experience.

Referring again to FIG. 5, the engine compartment 18 includes a variety of vehicle fixtures configured to hold and move fluids used in the operation of the vehicle 10. Some of the fixtures include fluid containers such as an engine coolant container 110, a windshield washer fluid container 114 (e.g., bottle), and a power steering fluid container 118 (e.g., bottle). Each of the containers 110, 114, 118 are configured to hold a fluid and act as a reservoir for the fluid. Maintaining proper fluid levels in each of the containers 110, 114, 118 is important to ensure that the vehicle 10 continues to function correctly and to prevent damage from occurring to the vehicle 10.

Figure 6:
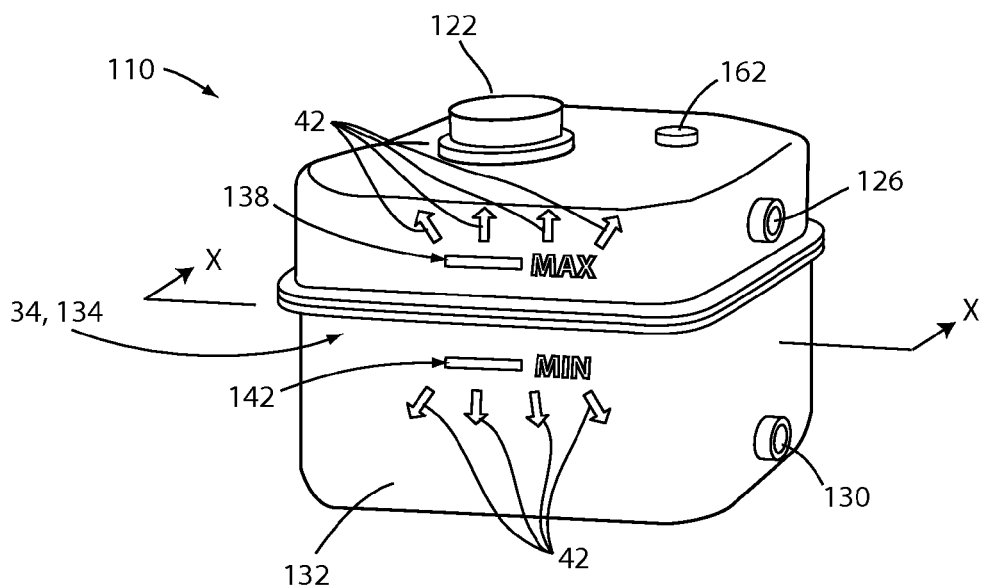
FIG. 6 is an enlarged perspective view of an engine coolant container having the illumination system.

Referring now to FIG. 6, the engine coolant container 110 is depicted with greater detail. The engine coolant container 110 is depicted as including a cap 122, an inflow port 126 and an outflow port 130. The engine coolant container 110 operates as a reservoir to store engine coolant that is not being utilized by the vehicle 10. The inflow port 126 allows engine coolant to enter the overflow container 110, and the outflow port 130 permits engine coolant to return to a coolant system of the vehicle 10 when needed. In the depicted embodiment, disposed on an external surface 132 of the overflow container 110 is a fluid level indicator 134 having a maximum fluid level marking 138 and a minimum fluid level marking 142. The maximum and minimum fluid level markings 138, 142 may have fill lines and/or text to help define a fill range in which a fluid level in the engine coolant container 110 should be kept. It should be understood that the fluid level indicator 134 may take a variety of configurations and that the description is exemplary and not intended to be limiting. The engine coolant container 110 is desirably composed of a durable polymer (e.g., plastic) capable of resisting the heat and chemical composition of an engine coolant 150. Preferably the engine coolant container 110 is translucent or substantially transparent such that a fluid level within the container 110 can be viewed by a person.

Traditionally, fluid level indicators and fill lines are molded into an exterior surface of the fluid containers (e.g., engine coolant container 110, the windshield washer fluid container 114, and the power steering fluid container 118). Conventional fluid indication systems rely on the transparent and/or translucent nature of the fluid container so that an onlooker can observe the height of a fluid within the container 110 and compare it to the fluid level indicator, thus allowing the onlooker to determine if the fluid level is within the proper operational fill range. However, determining the fluid level in conventional systems is complicated in non-optimal lighting conditions.

In one embodiment, the photoluminescent portion 34 may be disposed on the external surface 132 of the coolant container 110 and configured as the fluid level indicator 134. In such an embodiment, the light source 22, which irradiates the engine compartment 18 with the first emission 38, may excite the fluid level indicator 134 and cause the fluid level markings 138, 142 to emit the second emission 42. The second emission 42 would create the appearance to an onlooker that the maximum and minimum fluid level markings 138, 142 of the fluid level indicator were emitting an ambient glow. The ambient glow emitted from the fluid level indicator 134 would ease in the determination of whether the fluid level within the engine coolant container 110 was within the fill range because the maximum and minimum fluid level markings 138, 142 would be clearly indicated to the onlooker. The fluid level indicator 134 may be applied to the external surface 132 of the coolant container 110 by any of the aforementioned application methods described in connection with the photoluminescent portion 34, including painting, screen printing, and pad printing. It should be understood that the photoluminescent portion 34 may be configured as a fluid level indicator and applied to external surfaces of other fluid containers within the engine compartment 18 (e.g., windshield washer fluid container 114 or power steering fluid container 118) and excited in a substantially similar manner to that described in connection with the engine coolant container 110.

Figure 7:
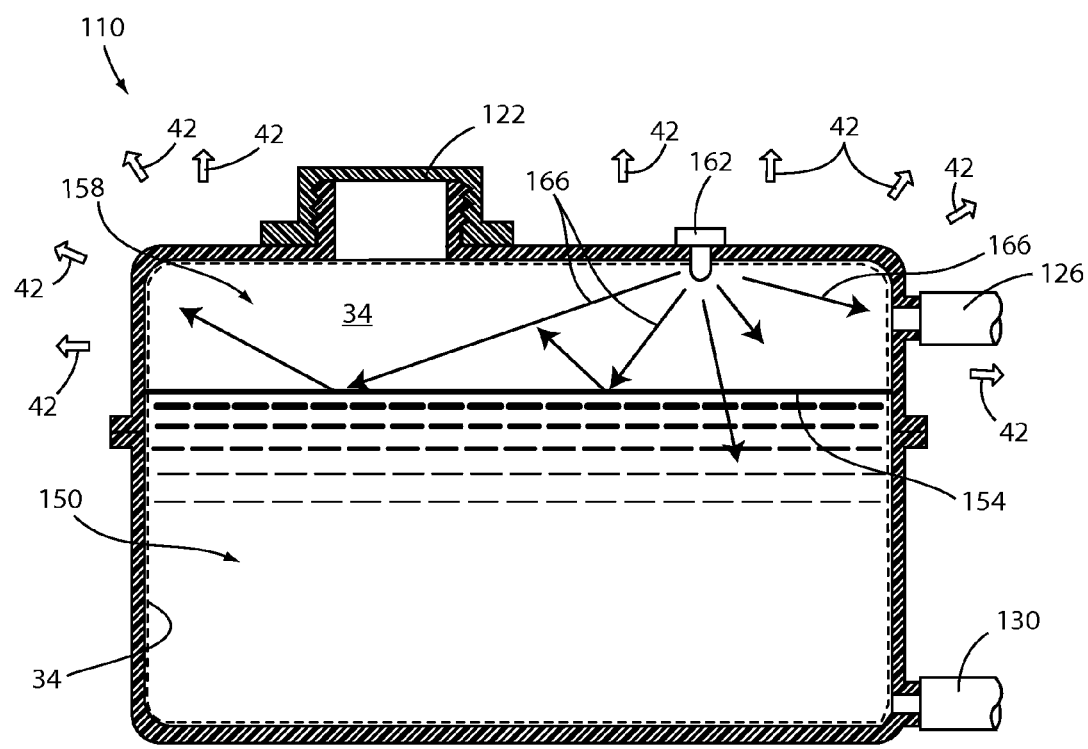
FIG. 7 is a cross-sectional view along line X of the engine coolant container of FIG. 6.

FIG. 7 depicts an enlarged cross sectional view of the engine coolant container 110 of FIG. 6, to reveal greater detail. When in use, the engine coolant container 110 functions as a reservoir for the engine coolant 150. When the engine coolant 150 occupies the overflow container 110, it settles to form a fluid level 154 above which a headspace 158 is defined within the engine coolant container 110. As the vehicle 10 requires more or less of the engine coolant 150, the fluid level 154 dynamically rises or falls within the engine coolant container 110, thereby expanding or contracting the headspace 158. Located at the top of the container 110 is a second light source 162 disposed within the headspace 158 of the container 110. It should be noted that the second light source 162 can be located anywhere on the top of the container 110, as well as along portions of a side of the container 110 or the cap 122. The second light source 162 may emit a fifth emission 166, which is similar to the first emission 38 in its ability to excite the photoluminescent portion 34 or plurality of photoluminescent portions 82 into emitting the second emission 42. In an exemplary embodiment, the second light source 162 is an LED that operates substantially similar to the description above in connection with the first light source 22. In other embodiments, the second light source 162 may be a light pipe, fiber optic, or other source of light. The second light source 162 can be activated upon opening of the hood 30, initialization of a vehicle feature, or may be configured to continuously run.

Referring again to FIG. 7, according to one exemplary embodiment the photoluminescent portion 34 may be disposed on an inner surface of the coolant container 110 and configured to coat the inner surface of the container 110. The photoluminescent portion 34 may coat a majority of the inside of the container 110, including both above and below the fluid level 154. In other embodiments, the photoluminescent portion 34 may coat only a portion of the engine coolant container 110 or be applied in a pattern or design.

Still referring to FIG. 7, the photoluminescent portion 34 is substantially backlit by the second light source 162 with respect to an onlooker. In other words, the photoluminescent portion 34 is disposed between an onlooker and the second light source 162. As the fifth emission 166 is emitted from the second light source 162, it radiates outward and contacts the engine coolant 150. The fifth emission 166 and the engine coolant 150 interact in such a way that the fifth emission 166 is substantially reflected or absorbed by the engine coolant 150. The reflected portion of the fifth emission 166 then continues on within the headspace 158 until it strikes and excites the photoluminescent portion 34. The backlit configuration of the photoluminescent portion 34 and the transparent or translucent nature of the engine coolant container 110 allow for the second emission 42 to pass through the engine coolant container 110 and outward into the engine compartment 18. The net effect of the reflection and absorption of the fifth emission 166 is that the engine coolant container 110 appears substantially illuminated above, but not below, the fluid level 154. In other words, the coolant container 110 is substantially illuminated only in portions corresponding to the headspace 158. As such, the fluid level 154 can be viewable from the outside and determined by an onlooker as the interface between the illuminated and non-illuminated portions of the engine coolant container 110.

As the fluid level 154 rises within the engine coolant container 110, the illuminated portion of the engine coolant container 110 will decrease and as the fluid level 154 falls, the illuminated portion of the engine coolant container 110 that is viewable by a person on the outside will increase. Thus, the fluid level 154 of the coolant 150 can be readily determined by an onlooker based on the degree of illumination of the engine coolant container 110. In some embodiments, the intensity of the first emission 38, and therefore the second emission 42, may be tied to the interior backlighting such that day and night effects can be accounted for and the intensity adjusted. It will be understood by one having ordinary skill in the art that the photoluminescent portion 34 may be applied to inner surfaces of the windshield washer fluid container 114 and the power steering fluid container 118 such that a fluid level within these fluid containers 114, 118 may be determined in a substantially similar way.

In embodiments utilizing photoluminescent materials on both the external surface 132 and the internal surface of the engine coolant container 110, different portions (e.g., the first photoluminescent portion 86, the second photoluminescent portion 90, or the third photoluminescent portion 94) of the plurality of photoluminescent portions 82 may be used for each surface. In one exemplary embodiment, the first photoluminescent portion 86 may be disposed on the inner surface of the engine coolant container 110 and the second photoluminescent portion 90 may be disposed on the external surface 132 and configured as the fluid level indicator 134. Once the fluid level 154 is determined based on the degree of illumination of the engine coolant container 110 as described above, it can be compared to the maximum and minimum fluid level markings 138, 142 of the fluid level indicator 134 to help an onlooker determine if the fluid level 154 is within the proper fill range. To aid in the determination of whether the fluid level 154 is within the proper fill range, the first and second photoluminescent portions 86, 90 may be configured to emit different color emissions (e.g., second and third emissions 42, 98) than one another.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illuminated fluid level indication system for a vehicle, comprising:
   a container;
   a fluid disposed in the container;
   a photoluminescent portion disposed on the container; and
   a light source operable to emit an emission to excite the photoluminescent portion and thereby illuminate the container,
   wherein a fluid level is determined based on a degree of illumination of the container when the photoluminescent portion is exposed to the emission.

2. The fluid level indication system of claim 1, wherein the light source is located within the container.

3. The fluid level indication system of claim 1, wherein the photoluminescent portion is disposed on an internal surface of the container.

4. The fluid level indication system of claim 3, wherein the photoluminescent portion coats a majority of the internal surface.

5. The fluid level indication system of claim 1, wherein the container is disposed in an engine compartment of a vehicle.

6. The fluid level indication system of claim 5, wherein the container is an engine coolant container.

7. The fluid level indication system of claim 1, wherein the container further comprises an external surface and a second photoluminescent portion is disposed on the external surface of the container.

8. An illumination system for a vehicle container, comprising:
   a fluid container;
   a photoluminescent portion disposed on the container; and
   a light source located proximate the container, the light source configured to emit an emission at a first wavelength directed toward the photoluminescent portion, wherein the photoluminescent portion is configured to convert the first wavelength to at least a second wavelength longer than the first wavelength to illuminate the container.

9. The illumination system of claim 8, wherein a fluid is disposed within the fluid container, the fluid defining a fluid level.

10. The illumination system of claim 9, wherein the photoluminescent portion is disposed on an internal surface of the container.

11. The illumination system of claim 10, wherein the fluid level is determined based on a degree of illumination of the fluid container when the photoluminescent portion is exposed to the emission at a first wavelength.

12. The illumination system of claim 8, wherein the photoluminescent portion is disposed on an external surface of the fluid container.

13. The illumination system of claim 8, wherein the fluid container is an engine coolant container.

14. An illumination system for a vehicle container, comprising:
   a container for holding a fluid which defines a fluid level and a headspace above the fluid;
   a photoluminescent portion located on the container; and
   a light source disposed inside the container operable to emit an emission to excite the photoluminescent portion, wherein the photoluminescent portion illuminates the container above the fluid level.

15. The illumination system of claim 14, wherein the fluid level is determined based on a degree of illumination of the container when the photoluminescent portion is exposed to the emission.

16. The illumination system of claim 14, wherein the photoluminescent portion is located on an internal surface of the container.

17. The illumination system of claim 16, wherein the photoluminescent portion covers a majority of the internal surface.

18. The illumination system of claim 14, wherein the emission is substantially absorbed or reflected by the fluid.

19. The illumination system of claim 14, wherein the container is disposed in an engine compartment of a vehicle.

20. The illumination system of claim 19, wherein the container is an engine coolant container.

* * * * *